United States Patent [19]

Iizuka

[11] Patent Number: 5,127,263
[45] Date of Patent: Jul. 7, 1992

[54] PROCESSING OF THROTTLE OPENING DEGREE INDICATIVE SIGNAL

[75] Inventor: Naonori Iizuka, Fuji, Japan

[73] Assignee: Jatco Corporation, Japan

[21] Appl. No.: 713,101

[22] Filed: Jun. 11, 1991

[30] Foreign Application Priority Data

Jun. 11, 1990 [JP]  Japan .................. 2-152332

[51] Int. Cl.$^5$ .......................... G01M 15/00
[52] U.S. Cl. ..................... 73/118.1; 73/117.3
[58] Field of Search ............. 73/118.1, 117.3; 123/494; 364/431.03, 431.04; 74/854, 855, 865, 870

[56] References Cited

U.S. PATENT DOCUMENTS 4,833,945  5/1989  Kondo .................. 74/865 X

FOREIGN PATENT DOCUMENTS 108572  5/1984  European Pat. Off. .......... 74/870
63-180755  7/1988  Japan .
1-144451  10/1989  Japan .

*Primary Examiner*—Jerry W. Myracle
*Attorney, Agent, or Firm*—Ronald P. Kananen

[57] ABSTRACT

A method and system for processing an output signal of a throttle opening degree sensor is disclosed. According to this signal processing, a predetermined correction of the output signal of the throttle sensor is prohibited when a rate of change of the output signal fails to be less than a predetermined value.

7 Claims, 3 Drawing Sheets

PROCESSING OF THROTTLE OPENING DEGREE INDICATIVE SIGNAL

BACKGROUND OF THE INVENTION

The present invention relates to a method of and a system for processing an output signal of a throttle opening degree sensor.

In automatic transmissions, a degree of opening of an engine throttle valve is detected by a throttle opening degree sensor. In order to compensate for a possible error due to an inappropriate mounting of the throttle opening degree sensor and/or for a product-to-product variability in the throttle opening degree sensor, a predetermined correction of the output signal of the throttle opening degree sensor is conducted. According to Japanese Patent Application First (unexamined) Publication No. 63-180755, an idle switch is provided and a predetermined correction of the output signal of a throttle opening degree sensor is conducted based on the actual output signal generated by the throttle sensor when the idle switch is rendered ON. According to Japanese Utility Model Application First (unexamined) Publication No. 1-14445, it is recognized that the engine throttle valve is fully closed when the engine revolution speed continues to stay in a predetermined low speed range for a predetermined period of time, and the actual output signal of the throttle sensor generated under this condition is used to conduct a predetermined correction of the output signal of the throttle sensor.

These two proposals pose a problem when the throttle valve is varied rapidly. In the case where the idle switch is used, if the throttle opening degree is increased rapidly from the fully closed state, the output signal of the throttle sensor follows this change without any delay, but there occurs a delay until the idle switch is rendered OFF. Thus, there occurs a period of time where the idle switch stays ON although the throttle valve has already been opened. If the correction is conducted during this period of time, the correction of the output signal is deviated toward a greater throttle opening degree. In the case where the engine revolution speed is used, the engine revolution speed varies slowly in response to a rapid change in the throttle opening degree. Thus, the correction of the output signal of the throttle sensor is deviated toward a greater throttle opening degree if the correction is conducted during this transition period.

An object of the present invention is to solve the problem encounted in the previously mentioned proposals.

SUMMARY OF THE INVENTION

According to one aspect of the present invention, there is provided a method of processing an output signal of a throttle opening degree sensor which detects an opening degree of a throttle valve of an engine, the method comprising the steps of:
repeatedly checking whether a rate of change of the output signal of the throttle opening degree sensor is less than a predetermined value;
conducting a predetermined correction of the output signal of the throttle opening degree sensor when a predetermined condition is met; and
prohibiting said predetermined correction when said rate of change of the output signal fails to be less than said predetermined value.

According to another aspect of the present invention, there is provided a system for processing an output signal of a throttle opening degree sensor which detects an opening degree of a throttle valve of an engine, the system comprising:
means for repeatedly checking whether a rate of change of the output signal of the throttle opening degree sensor is less than a predetermined value;
means for conducting a predetermined correction of the output signal of the throttle opening degree sensor when a predetermined condition is met; and
means for prohibiting said predetermined correction when said rate of change of the output signal fails to be less than said predetermined value.

DETAILED DESCRIPTION OF THE INVENTION

Figure 1:
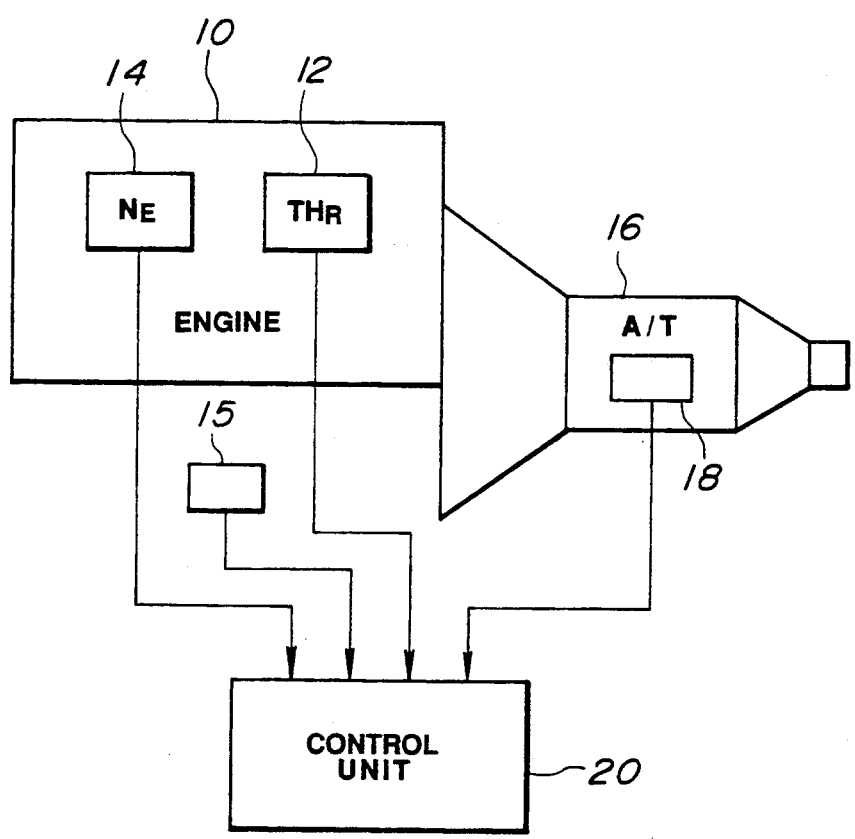
FIG. 1 is a block diagram of a portion of an automotive vehicle.

Referring to FIG. 1, there is shown a portion of an automotive vehicle including an engine 10 and an automatic transmission 18 drivingly coupled with the engine 10 via a hydrokinetic torque transmitting unit such as a torque converter. The engine 10 is provided with a throttle opening degree sensor 12 and an engine revolution speed sensor 14. The engine 10 is associated with an idle switch 15. The automatic transmission 16 is provided with an inhibitor switch 18. This switch 18 indicates a position at which a manual selector of the automatic transmission is placed. The output signals of the throttle opening degree sensor 12, engine revolution speed sensor 14, idle switch 15, and selector position indicating switch 18 are fed to a microcomputer-based control unit 20.

Figure 2:
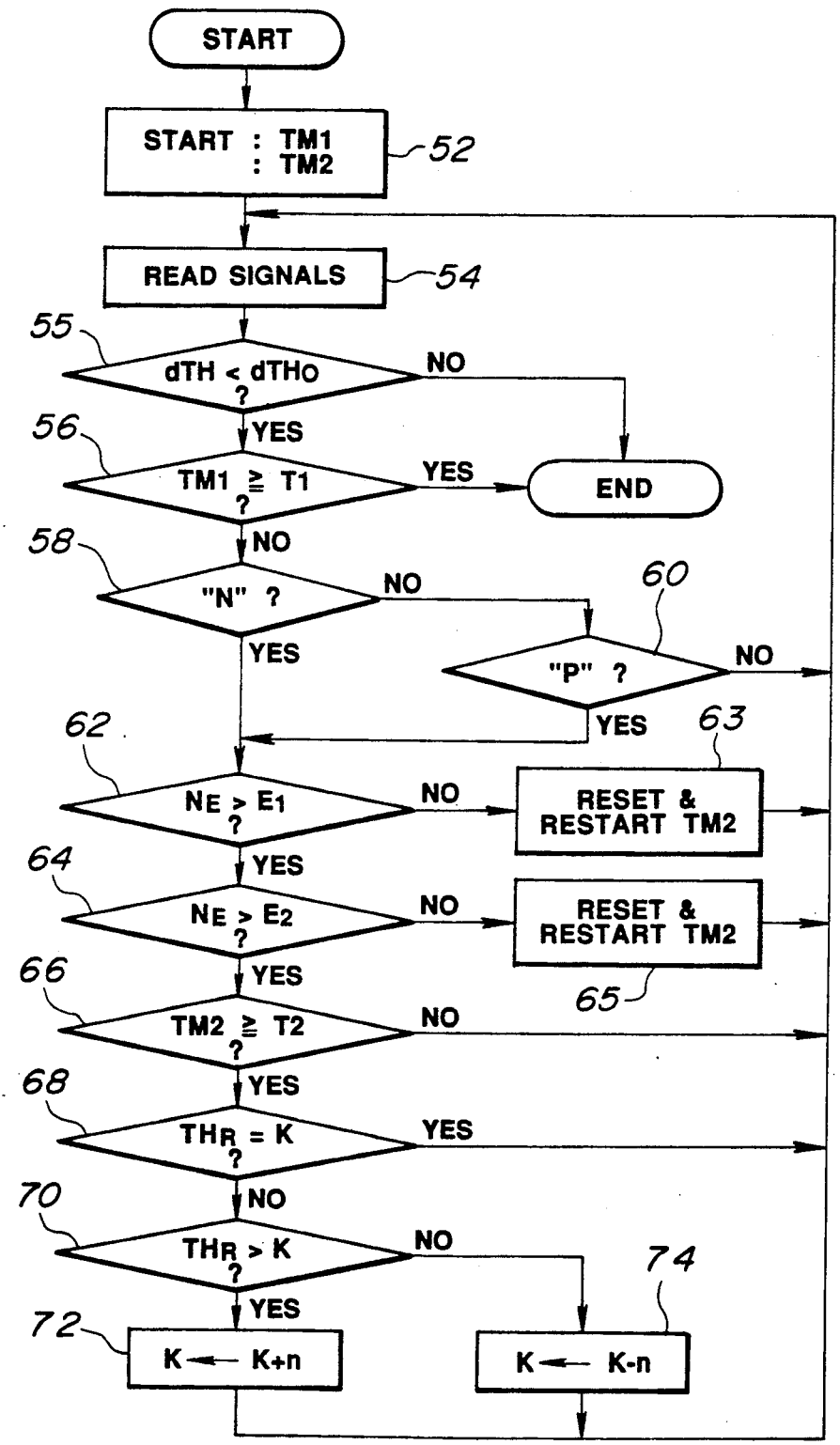
FIG. 2 is a flow diagram of a routine to correct a standard value K.

In the control unit 20, execution of a routine shown in FIG. 2 is effected, based on at least some of the output signals fed to the control unit 20, to correct the output signal of the throttle opening degree sensor 12. This routine is initiated by a command for effecting the correction.

In FIG. 2, at a step 52, times TM1 and TM2 are started. Subsequently, at a step 54, reading operations of the output signals of the sensors 12, 14 and switch 18 are performed. There is then an interrogation 55 as to whether or not a rate of change dTH (i.e. TH: a stored throttle opening degree data) is less than a predetermined value $dTH_0$. If dTH is not less than $dTH_0$, the routine proceeds to an end point. If dTH is less than $dTH_0$, there is an interrogation whether the content of the time TM1 has reached a predetermined time value T1 or not. If this is the case, the routine proceeds to the end point. If the inquiry at the interrogation 56 results in a negative answer, there is an interrogation 58 as to whether the position selected by the manual selector is in an N (neutral) range position or not. If the N range is not selected, the routine proceeds to an interrogation 60 as to whether or not a P (park) range position is selected. If the range position is not selected, the routine proceeds back to the step 54. If the P range position is selected, the routine proceeds to an interrogation 62 as to whether or not an engine revolution speed data $N_E$ is greater than a predetermined value $E_1$. If $N_E$ is not greater than $E_1$, the timer TM2 is reset and restarted at a step 63 before the routine proceeds back to the step 54. If $N_E$ is greater than $E_1$, there is an interrogation 64 as to whether or not $N_E$ is less than a predetermined value $E_2$ ($>E_1$). If $N_E$ is not less than $E_2$, the timer TM2 is reset and restarted at a step 65 before the routine proceeds back to the step 54. The predetermined values $E_1$ and $E_2$ designate the lower and upper limits of an idling engine revolution speed range. If $N_E$ is less than $E_2$ at the interrogation 64, the routine proceeds to an interrogation 66 as to whether or not the content of the timer TM2 has reached a predetermined time value T2. If TM2 is less than T2, the routine proceeds back to the step 54. If TM2 is greater than or equal to T2, there is an interrogation 68 as to whether or not an actual or real output signal $TH_R$ of the throttle opening degree sensor 12 is equal to a standard value K. The standard value K is initially set equal to a predetermined initial value $K_O$ at execution of the initial loop of the routine. If $TH_R$ is equal to $K_O$, the routine proceeds back to the step 54. If $TH_R$ is not equal to K at the interrogation 68, the routine proceeds to an interrogation 70 as to whether or not $TH_R$ is greater than K. If $K_R$ is greater than K, K is increased by a constant n at a step 72 before the routine proceeds back to the step 54. If $K_R$ is not greater than K, K is decreased by the constant n at a step 74 before the routine proceeds to the step 54.

According to this routine as shown in FIG. 2, the standard value K is varied toward the throttle sensor output signal $TH_R$ after a state wherein the rate of change of throttle opening degree is very small (step 55), N or P range is selected (steps 58, 60), and engine revolution speed stays between the upper and lower limits $E_1$ and $E_2$ has continued to exist for the period of time T2. This case is regarded as that wherein the throttle valve is fully closed. Subsequently, the variation of this standard value K continues until TM1 becomes equal to the time value T1. The thus determined value K corresponds to the output signal of the throttle opening degree sensor 12 and is used in the routine shown partially in FIG. 3.

Figure 3:
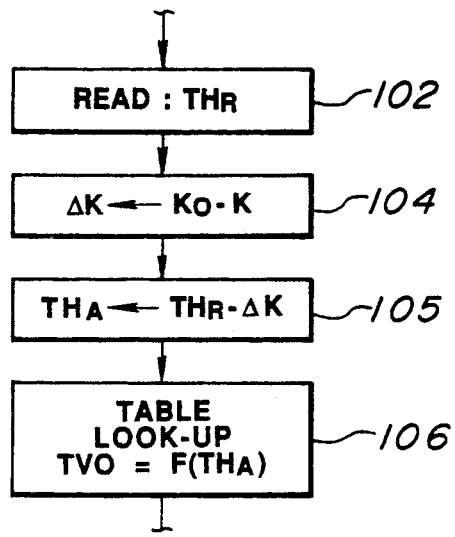
FIG. 3 is a portion of a flow diagram of a routine to conduct a predetermined correction using the standard value K.

In FIG. 3, at a step 102, the output signal $TH_R$ of the throttle opening degree sensor 12 is read. At the next step 104, the value K is subtracted from the initial value $K_O$ to give a difference as delta K ($\Delta K$). At a step 105, delta K is subtracted from $TH_R$ to give a result of $TH_A$. This $TH_A$ is used to perform a table look-up operation to retrieve a throttle value opening degree TVO which is used for a shift control.

Figure 4:
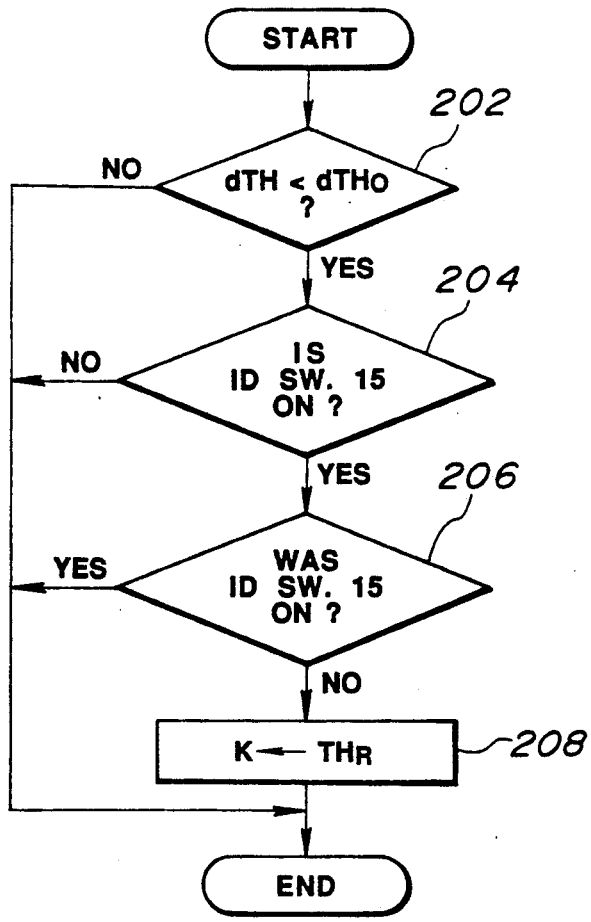
FIG. 4 is a flow diagram of an alternative routine to correct a standard value K.

Referring to FIG. 4, a second embodiment is described. The second embodiment is substantially the same as the first embodiment explained in connection with FIGS. 1 to 3. However, the second embodiment is different from the first embodiment in that the routine shown in FIG. 2 is replaced by the routine shown in FIG. 4.

In the second embodiment, the idle switch 15 is used. In FIG. 4, there is an interrogation 202 as to whether or not dTH is less than $dTH_0$. If this is the case, there is an interrogation 204 as to whether or not the idle switch is rendered ON (closed) after checking the present idle switch state data stored by a reading operation performed in the present run of the routine. If this is the case, there is an interrogation 206 as to whether or not the idle switch was ON after checking the previous idle switch data stored by the reading operation performed in the previous run of the routine. If this interrogation 206 results in a negative answer, the throttle signal $TH_R$ is set to a standard value K at a step 208.

From the preceding description of the two embodiments, it is clear that the correction of the standard value K is prohibited if there occurs a rapid change in the output signal of the throttle opening degree sensor. Thus, the correction of the output signal of the throttle opening degree sensor is prevented if the throttle valve is not in the fully closed state.

What is claimed is:

1. A method of processing an output signal of a throttle opening degree sensor which detects an opening degree of a throttle value of an engine, the method comprising the steps of:
   repeatedly checking whether a rate of change of the output signal of the throttle opening degree sensor is less than a predetermined value;
   conducting a predetermined correction of the output signal of the throttle opening degree sensor when a predetermined condition is met; and
   prohibiting said predetermined correction when said rate of change of the output signal fails to be less than said predetermined value.

2. A method of processing an output signal of a throttle opening degree sensor which detects an opening degree of a throttle value of an engine, the method comprising the steps of:
   repeatedly checking whether a rate of change of the output signal of the throttle opening degree sensor is less than a predetermined value;
   conducting a predetermined correction of the output signal of the throttle opening degree sensor when a predetermined condition state has continued for a first period of time as long as said predetermined state continues to exit thereafter; and
   prohibiting said predetermined correction when said rate of change of the output signal fails to be less than said predetermined value.

3. A method as claimed in claim 2, in said predetermined state, said rate of change of the output signal is less than said predetermined value, and an engine revolution speed stays between two predetermined limits.

4. In an automotive vehicle having an engine with a throttle valve which opens in degrees and an automatic transmission drivingly coupled with the engine, the engine having a throttle opening degree sensor generating an output signal variable with a varying opening degree of the throttle valve and an engine revolution speed sensor generating an output signal indicative of a revolution speed of the engine, the automatic transmission having a position wherein a neutral state is established in the automatic transmission:
   a method of processing the output signal of the throttle opening degree sensor comprising the steps of:
   repeatedly checking whether a rate of change of the output signal of the throttle opening degree sensor is less than a predetermined value;
   repeatedly checking whether the neutral state is established in the automatic transmission;
   repeatedly checking whether the engine revolution speed stays between two predetermined limits;
   conducting a predetermined correction of the output signal of the throttle opening degree sensor after a predetermined state has continued for a first period of time as long as said predetermined state continue to exit thereafter; and prohibiting said predetermined correction when said rate of change of the output signal fails to be less than said predetermined value.

5. A method as claimed in claim 4, wherein, in said predetermined state, said rate of change of the output signal of the throttle opening degree sensor is less than said predetermined value, the engine revolution speed stays between said two predetermined limits, and the neutral state is established in the automatic transmission.

6. A method of processing an output signal of a throttle opening degree sensor which detects an opening degree of a throttle valve of an engine, the engine being associated with an idle switch, the method comprising the steps of:
repeatedly checking whether a rate of change of the output signal of the throttle opening degree sensor is less than a predetermined value;
conducting a predetermined correction of the output signal of the throttle opening degree sensor after the idle switch has been rendered ON; and
prohibiting said predetermined correction when said rate of change of the output signal fails to be less than said predetermined value.

7. A system for processing an output signal of a throttle opening degree sensor which detects an opening degree of a throttle valve of an engine, the system comprising:
means for repeatedly checking whether a rate of change of the output signal of the throttle opening degree sensor is less than a predetermined value;
means for conducting a predetermined correction of the output signal of the throttle opening degree sensor when a predetermined condition is met; and
means for prohibiting said predetermined correction when said rate of change of the output signal fails to be less than said predetermined value.

* * * * *